(12) United States Patent
Jin (10) Patent No.: US 10,101,859 B2
(45) Date of Patent: Oct. 16, 2018

(54) ARRAY SUBSTRATE, DISPLAY PANEL AND DISPLAY DEVICE

(71) Applicants: Shanghai AVIC Optoelectronics Co., Ltd., Shanghai (CN); Tianma Micro-Electronics Co., Ltd., Shenzhen (CN)

(72) Inventor: Huijun Jin, Shanghai (CN)

(73) Assignees: SHANGHAI AVIC OPTOELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 245 days.

(21) Appl. No.: 14/951,432

(22) Filed: Nov. 24, 2015

(65) Prior Publication Data

US 2016/0328047 A1 Nov. 10, 2016

(30) Foreign Application Priority Data

May 8, 2015 (CN) .......................... 2015 1 0232761

(51) Int. Cl.
| | |
|---|---|
| *G09G 5/00* | (2006.01) |
| *G06F 3/044* | (2006.01) |
| *G06F 3/041* | (2006.01) |

(52) U.S. Cl.
CPC ............ *G06F 3/044* (2013.01); *G06F 3/0412* (2013.01); *G06F 3/0416* (2013.01); *G06F 2203/04106* (2013.01)

(58) Field of Classification Search
CPC .. G06F 2203/04111; G06F 2203/04112; G06F 3/044; G06F 2203/04106; G06F 3/0412; G06F 3/0416

(Continued)

(56) References Cited

U.S. PATENT DOCUMENTS

| | | |
|---|---|---|
| 2011/0267296 A1 | 11/2011 | Noguchi et al. |
| 2014/0333574 A1 | 11/2014 | Xi |

(Continued)

FOREIGN PATENT DOCUMENTS

| | | |
|---|---|---|
| CN | 103927069 A | 7/2014 |
| CN | 103941939 A | 7/2014 |

(Continued)

OTHER PUBLICATIONS

Chinese Application No. 201510232761.4, First Office Action dated May 18, 2017.

*Primary Examiner* — Jennifer Nguyen
(74) *Attorney, Agent, or Firm* — Alston & Bird LLP (57) ABSTRACT

An array substrate, a display panel and a display device are provided, each including multiple touch-control electrodes independent from each other and multiple electrode coils. A position of each electrode coil corresponds to a position of one touch-control electrode. Since the touch-control electrodes and the electrode coils are integrated into the array substrate and the touch panel needs not to be separately arranged outside the display device, the thickness of the display device may be effectively reduced. In addition, the touch-control structure includes the touch-control electrodes and the electrode coils, i.e., a self-capacitive structure and an inductive structure, enabling the display device to work in both the capacitive touch-control mode and the inductive touch-control mode; hence, the display device can be applicable to different applications by switching between the two touch-control modes, broadening the application range of the display device.

11 Claims, 7 Drawing Sheets

(58) Field of Classification Search
USPC .................................................. 345/173–178
See application file for complete search history.

(56) References Cited

U.S. PATENT DOCUMENTS

| | | | |
|---|---|---|---|
| 2015/0022488 A1* | 1/2015 | Xi | G06F 3/046 |
| | | | 345/174 |
| 2015/0185905 A1 | 7/2015 | Ma et al. | |
| 2016/0154511 A1* | 6/2016 | Yao | G06F 3/0412 |
| | | | 345/174 |
| 2016/0291789 A1* | 10/2016 | Zhai | G06F 3/0412 |
| 2016/0357312 A1* | 12/2016 | Li | G06F 3/044 |
| 2017/0045978 A1* | 2/2017 | Xu | G06F 3/046 |

FOREIGN PATENT DOCUMENTS

| | | |
|---|---|---|
| CN | 104298406 A | 1/2015 |
| TW | 201421302 A | 6/2014 |

* cited by examiner

ARRAY SUBSTRATE, DISPLAY PANEL AND DISPLAY DEVICE

CROSS REFERENCE TO RELATED APPLICATIONS

The present application claims the priority to Chinese Patent Application No. 201510232761.4, entitled "ARRAY SUBSTRATE, DISPLAY PANEL AND DISPLAY DEVICE", filed on May 8, 2015 with the State Intellectual Property Office of the Peoples Republic of China, which is incorporated herein by reference in its entirety for all purposes.

FIELD OF THE INVENTION

The present disclosure relates to the technical field of image display, and in particular, to an array substrate, a display panel and a display device.

BACKGROUND OF THE INVENTION

A touch display device is a device that enables a user to input user instructions by selecting displayed content by means of a finger or an object such as a stylus. When the finger or the object contacts a touch panel of a touch display device, the touch display device detects a touch point, and the touch display device is driven according to an input instruction and implements a specific display. According to different implementation principles, existing touch display devices mainly include capacitive touch display devices and inductive touch display devices. For most of the existing capacitive touch display devices and inductive touch display devices, a touch panel and a display device are arranged separately, so that the capacitive touch display devices and inductive touch display devices have large thicknesses.

BRIEF SUMMARY OF THE INVENTION

In view of the above, there are provided in the present disclosure an array substrate, a display panel and a display device, to solve the problem of large thickness of the display device by integrating a touch-control structure into an array substrate. In addition, the touch-control structure includes a capacitive touch-control structure and an inductive touch-control structure, broadening the application range of the display device.

In order to achieve the above objectives, the following technical solutions are provided in the present disclosure.

An array substrate includes:
multiple touch-control electrodes which are independent from each other; and
multiple electrode coils, wherein a position of each of the electrode coils corresponds to a position of one of the touch-control electrodes.

Optionally, the multiple independent touch-control electrodes are formed by dividing a common electrode of the array substrate.

Optionally, each electrode coil is electrically connected to the touch-control electrode whose position corresponds to the position of the each electrode coil; and
in a capacitive touch-control mode, a capacitive detection signal is inputted through the electrode coils to the touch-control electrodes, and positions of the touch-control electrodes respectively correspond to positions of the electrode coils.

Optionally, the array substrate further includes:
multiple first electrode leads and multiple second electrode leads; where
a first end of each of the first electrode leads is electrically connected to a first end of one of the electrode coils, and a second end of each of the first electrode leads is connected to a detection signal end; and a first end of each of the second electrode leads is electrically connected to a second end of one of the electrode coils, and a second end of each of the second electrode leads is connected to a reference signal end.

Optionally, the array substrate further includes multiple switch units; where
a first end of each of the switch units is connected to the first end of the second electrode lead, a second end of each of the switch units is connected to the reference signal end, and a control end of each of the switch units is connected to a control signal end.

Optionally, the switch units are transistors; and a first end of each of the transistors is connected to the first end of the second electrode lead, a second end of each of the transistors is connected to the reference signal end, and a control end of each of the transistors is connected to the control signal end.

Optionally, each of the first electrode leads has a portion overlapping one of the electrode coils, and the first electrode leads are not in the same conductive layer with the electrode coils.

Optionally, each of the first electrode leads has a portion overlapping one of the electrode coils; and each of the first electrode leads includes:
a first lead part outside the range of one electrode coil; and
a first connecting part overlapping the one electrode coil; where
the first lead part is in the same conductive layer with the one electrode coil; the first connecting part is not in the same conductive layer with the one electrode coil; and the first connecting part electrically connects the one electrode coil to the first lead part through a via hole.

Optionally, each of the second electrode leads has a portion overlapping one of the electrode coils, and the second electrode leads are not in the same conductive layer with the electrode coils.

Optionally, each of the second electrode leads has a portion overlapping one of the electrode coils; and each of the second electrode leads includes:
a second lead part outside the range of one electrode coil; and
a second connecting part overlapping the one electrode coil; where
the second lead part is in the same conductive layer with the one electrode coil; the second connecting part is not in the same conductive layer with the one electrode coil; and the second connecting part electrically connects the one electrode coil to the second lead part through a via hole.

Optionally, in a capacitive touch-control mode, a capacitive detection signal is inputted to the touch-control electrodes; or in an inductive touch-control mode, an inductive detection signal is inputted to the electrode coils.

Correspondingly, there is also provided in the present disclosure a display panel including an array substrate as described above.

Correspondingly, there is also provided in the present disclosure a display device including the above-described display panel.

Compared with the conventional technology, the technical solutions provided in the present disclosure have at least the following advantages.

The array substrate, display panel and display device provided in the present disclosure each include multiple touch-control electrodes which are independent from each other; and multiple electrode coils, where a position of each of the electrode coils corresponds to a position of one of the touch-control electrodes. According to the above, in the technical solutions provided in the present disclosure, since the touch-control electrodes and the electrode coils are integrated into the array substrate and the touch panel needs not to be separately arranged outside the display device, the thickness of the display device may be effectively reduced. In addition, the touch-control structure provided in the present disclosure includes the touch-control electrodes and the electrode coils, i.e., a self-capacitive structure and an inductive structure, enabling the display device to work in both the capacitive touch-control mode and the inductive touch-control mode; hence, the display device can be applicable to different applications by switching between the two touch-control modes, broadening the application range of the display device.

BRIEF DESCRIPTION OF THE DRAWINGS

The accompanying drawings to be used in the description of the embodiments or the conventional technology are described briefly as follows, so that the technical solutions according to the embodiments of the present disclosure or according to the conventional technology will become clearer. It is obvious that the accompanying drawings in the following description are only some embodiments of the present disclosure. For those skilled in the art, other accompanying drawings may be obtained according to these accompanying drawings without any creative work.

DETAILED DESCRIPTION OF THE INVENTION

Technical solutions according to embodiments of the present disclosure are described clearly and completely hereinafter in conjunction with the accompanying drawings used in descriptions of the embodiments of the present disclosure. It is obvious that the described embodiments are only a part of rather than all of the embodiments of the present disclosure. All other embodiments obtained by those skilled in the art based on the embodiments in the present disclosure without any creative work should fall within the protection scope of the present disclosure.

As reflected in the background, for most of the existing capacitive touch display devices and inductive touch display devices, the touch panel and the display device are arranged separately, and accordingly, the capacitive touch display devices and inductive touch display devices have large thicknesses.

In view of the above disadvantage, an array substrate is provided according to an embodiment of the present disclosure, where a touch-control structure is integrated into the array substrate, so that the thickness of a display device is reduced. In addition, the touch-control structure may be embodied as a capacitive touch-control structure and an inductive touch-control structure, broadening the application of the display device. Specifically, the array substrate according to the embodiment of the present disclosure is described in detail in conjunction with FIGS. 1-10.

Figure 1:
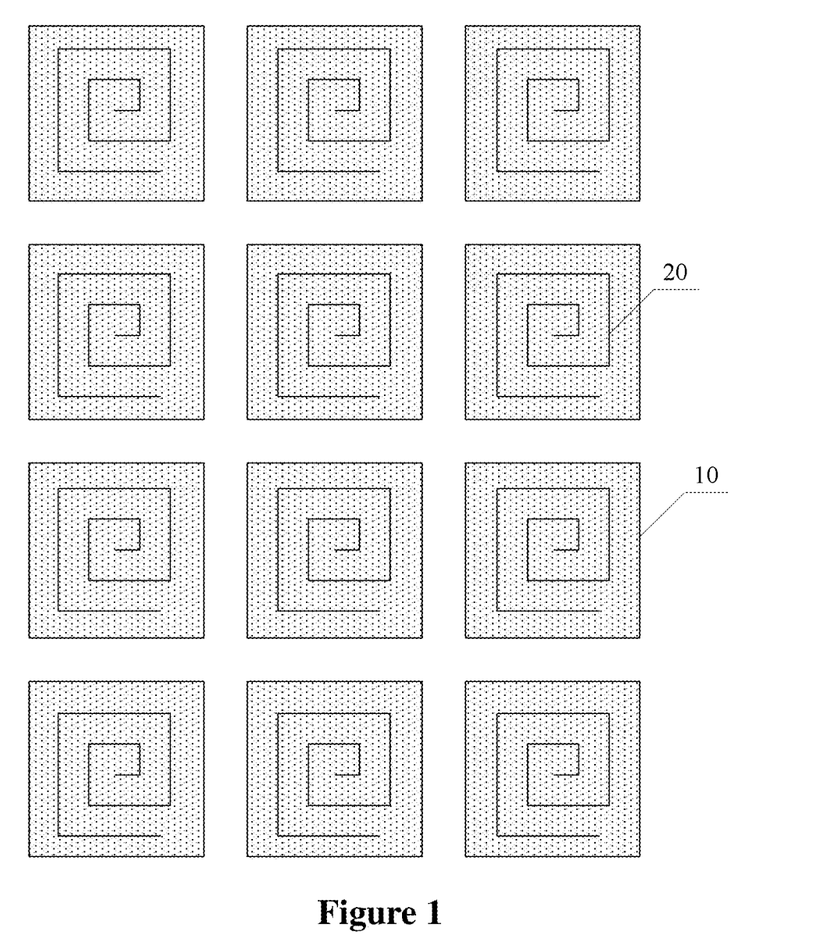
FIG. 1 depicts a schematic diagram of a touch-control structure of an array substrate according to an embodiment of the present disclosure.

FIG. 1 is a schematic diagram of a touch-control structure of an array substrate according to an embodiment of the present disclosure; the array substrate includes: multiple touch-control electrodes 10 which are independent from each other; and multiple electrode coils 20, where a position of each of the electrode coils 20 corresponds to a position of one of the touch-control electrodes 10.

If a capacitive touch-control mode is applied to the array substrate according to the embodiment, a capacitive detection signal is inputted to the touch-control electrodes 10; or if an inductive touch-control mode is applied to the array substrate according to the embodiment, an inductive detection signal is inputted to the electrode coils 20.

Furthermore, the multiple independent touch-control electrodes are formed by dividing a common electrode of the array substrate, so that no additional layer is provided to form the touch-control electrodes and resources are saved.

According to the above, in the technical solution according to the embodiment of the present disclosure, since the touch-control electrodes and the electrode coils are integrated into the array substrate and the touch panel needs not to be separately arranged outside the display device, the thickness of the display device may be effectively reduced. In addition, the touch-control structure provided in the present disclosure includes the touch-control electrodes and the electrode coils, i.e., a self-capacitive structure and an inductive structure, enabling the display device to work in both the capacitive touch-control mode and the inductive touch-control mode; hence, the display device can be applicable to different applications by switching between the two touch-control modes, broadening the application range of the display device.

Figure 2:
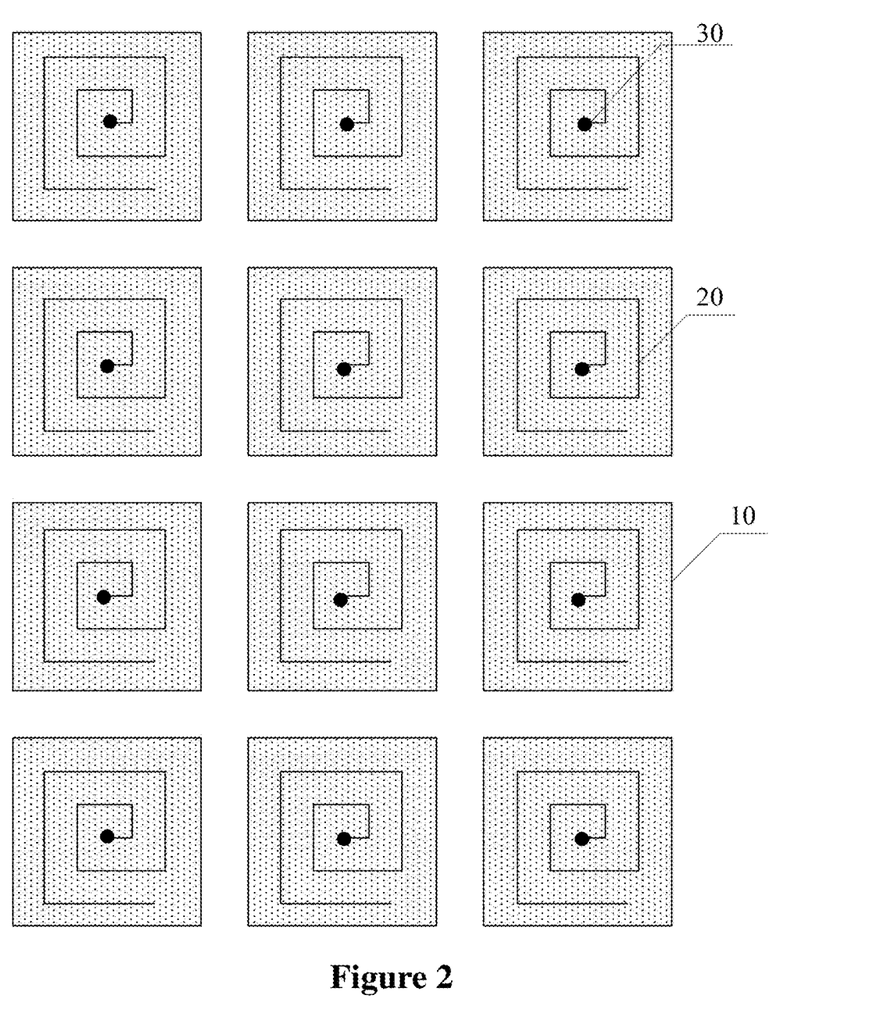
FIG. 2 depicts a schematic diagram of a touch-control structure of an array substrate according to an embodiment of the present disclosure.

In the case that the array substrate is switched to work in the capacitive touch-control mode, a capacitive detection signal needs to be input to the touch-control electrodes, where the capacitive detection signal may be transmitted through additional leads. Additionally, in the array substrate of the embodiment, the capacitive detection signal may be transmitted to the touch-control electrodes through the electrode coils. FIG. 2 is a schematic diagram of a touch-control structure of an array substrate according to another embodiment of the present disclosure, and the array substrate includes: multiple touch-control electrodes 10 which are independent from each other; and multiple electrode coils 20, where a position of each of the electrode coils 20 corresponds to a position of one of the touch-control electrodes 10.

Specifically, each electrode coil 20 is electrically connected to the touch-control electrode 10 whose position corresponds to the position of the each electrode coil 20; and in a capacitive touch-control mode, a capacitive detection signal is inputted through the electrode coils 20 to the touch-control electrodes 10, and positions of the touch-control electrodes 10 respectively correspond to positions of the electrode coils 20.

Since the electrode coils and the touch-control electrodes are provided in different conductive layers, as shown in FIG. 2, the electrode coil and the touch-control electrode may be electrically connected to each other through a via hole 30 provided between the electrode coil and the touch-control electrode. Alternatively, in another embodiment of the present disclosure, the electrode coil and the touch-control electrode may be electrically connected to each other through leads which are respectively connected to the electrode coil and the touch-control electrode and extend to a non-display area of the array substrate. The manner for achieving electrical connection is not limited in the present disclosure.

Figure 3:
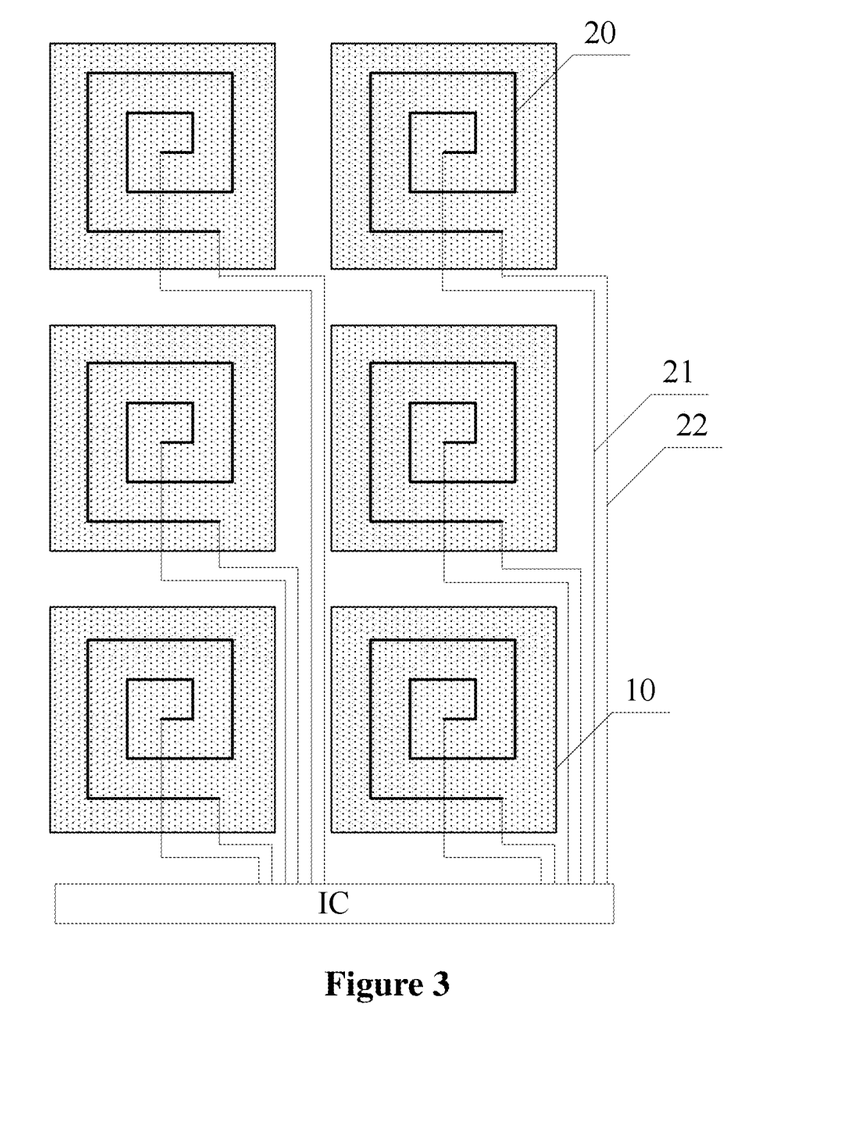
FIG. 3 depicts a schematic diagram of a touch-control structure of an array substrate according to an embodiment of the present disclosure.

In order to transmit signals to the electrode coils, electrode leads may be provided to connect different ends of the electrode coils. FIG. 3 is a schematic diagram of a touch-control structure of an array substrate according to yet another embodiment of the present disclosure. The array substrate includes: multiple touch-control electrodes 10 which are independent from each other; and multiple electrode coils 20, where a position of each of the electrode coils 20 corresponds to a position of one of the touch-control electrodes 10.

The array substrate further includes: multiple first electrode leads 21 and multiple second electrode leads 22, where a first end of each of the first electrode leads 21 is electrically connected to a first end of one of the electrode coils 20, and a second end of each of the first electrode leads 21 is connected to a detection signal end (not shown in FIG. 3); and a first end of each of the second electrode leads 22 is electrically connected to a second end of one of the electrode coils 20, and a second end of each of the first electrode leads 22 is connected to a reference signal end (not shown in FIG. 3).

In the case that each electrode coil is electrically connected to one touch-control electrode whose position corresponds to the position of the each electrode coil, in the capacitive touch-control mode, the first electrode lead and the second electrode lead are equivalent to wires which are connected in parallel and have the same electrical potential, and a capacitive detection signal is transmitted to the touch-control electrode through the electrode coil; and in the inductive touch-control mode, an inductive detection signal is transmitted to the electrode coil through the first electrode lead, then the inductive detection signal flows through the electrode coil and reaches the reference signal end through the second electrode lead. As shown in FIG. 3, the detection signal end and the reference signal end may be integrated into a same driving integrated circuit.

Figure 4:
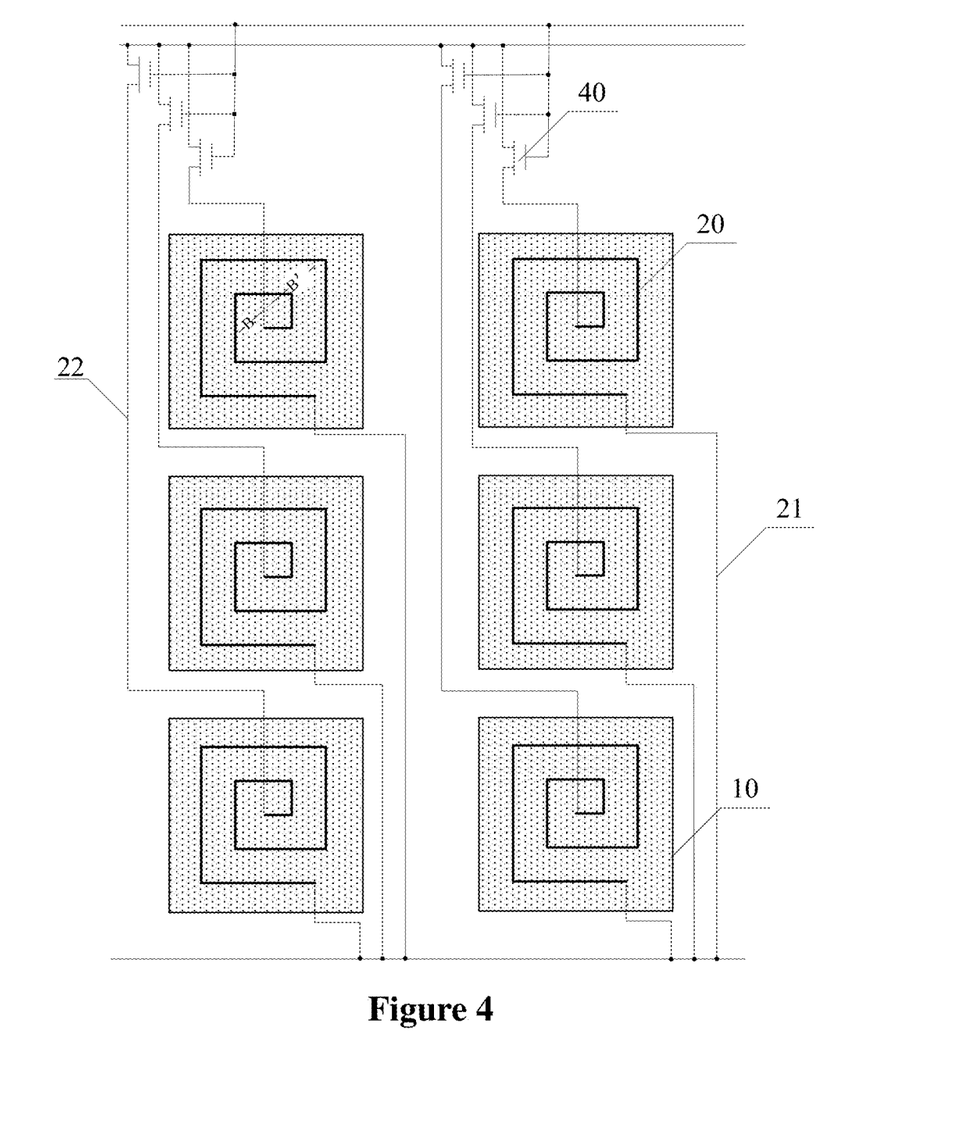
FIG. 4 depicts a schematic diagram of a touch-control structure of an array substrate according to an embodiment of the present disclosure.

Further, FIG. 4 is a schematic diagram of a touch-control structure of an array substrate according to still another embodiment of the present disclosure.

The array substrate includes: multiple touch-control electrodes 10 which are independent from each other; multiple electrode coils 20, where a position of each of the electrode coils 20 corresponds to a position of one of the touch-control electrodes 10; and multiple first electrode leads 21 and multiple second electrode leads 22, where a first end of each of the first electrode leads 21 is electrically connected to a first end of one of the electrode coils 20, and a second end of each of the first electrode leads 21 is connected to a detection signal end (not shown in FIG. 4); and a first end of each of the second electrode leads 22 is electrically connected to a second end of one of the electrode coils 20, and a second end of each of the first electrode leads 22 is connected to a reference signal end (not shown in FIG. 4).

The array substrate further includes multiple switch units 40. A first end of each of the switch units 40 is connected to the first end of one of the second electrode leads 22, a second end of each of the switch units 40 is connected to the reference signal end, and a control end of each of the switch units 40 is connected to a control signal end. Optionally, the switch units may be embodied as transistors, where a first end of each of the transistors is connected to the first end of one of the second electrode leads, a second end of each of the transistors is connected to the reference signal end, and a control end of each of the transistors is connected to the control signal end. Optionally, in the array substrate according to the embodiment, the multiple transistors are of the same type, and control ends of the multiple transistors are connected to the same control signal end.

In the case that each electrode coil is electrically connected to one touch-control electrode whose position corresponds to the position of the each electrode coil, in the capacitive touch-control mode, the second electrode lead is disconnected to the reference signal end by the switch unit, then the detection signal end outputs a capacitive detection signal, and the capacitive detection signal is transmitted to the touch-control electrode through the first electrode lead. In the inductive touch-control mode, the second electrode lead is connected to the reference signal end by the switch unit, then the detection signal end outputs an inductive detection signal, and the inductive detection signal is transmitted to the electrode coil through the second electrode lead.

Since one end of an electrode coil is positioned within the range of the electrode coil, the electrode lead connected to the end should pass through multiple turns of the electrode coil. Thus, each of the first electrode leads has an overlapping area with one of the electrode coils, and the first electrode leads are not in the same conductive layer with the electrode coils. Additionally or alternatively, each of the second electrode leads has an overlapping area with one of the electrode coils, and the second electrode leads are not in the same conductive layer with the electrode coils.

Figure 5:
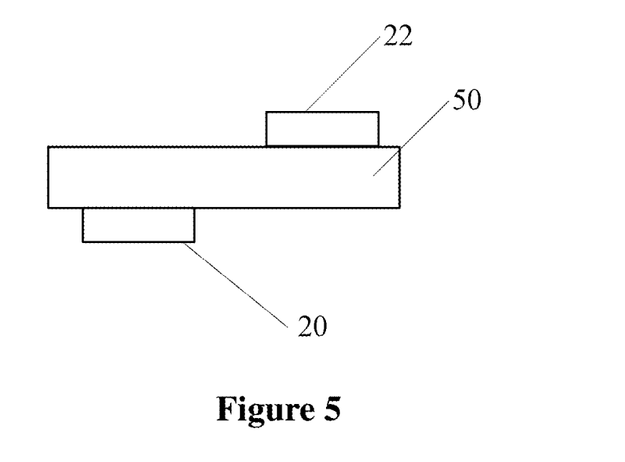
FIG. 5 depicts a sectional view of FIG. 4 along line of BB'.

FIG. 5 is a sectional view of FIG. 4 along line BB'. Each second electrode lead 22 has an overlapping area with one electrode coil 20; the second electrode lead 22 is not in the same conductive layer with the electrode coil 20; and an insulating layer 50 is provided between the second electrode lead 22 and the electrode coil 20.

A via hole (not shown in FIG. 5) needs to be provided in the insulating layer, through which the first end of the second electrode lead is connected to the second end of the electrode coil.

Furthermore, each electrode lead having an overlapping area with one electrode coil may include two parts, namely, a part overlapping the electrode coil and a part outside the range of the electrode coil. The part overlapping the electrode coil is not in the same conductive layer with the electrode coil.

That is, each first electrode lead has an overlapping area with one electrode coil; and each first electrode lead includes: a first lead part outside the range of electrode coil; and a first connecting part overlapping the electrode coil; where the first lead part is in the same conductive layer with the electrode coil; the first connecting part is not in the same conductive layer with the electrode coil; and the first connecting part electrically connects the electrode coil to the first lead part through a via hole. Additionally or alternatively, each second electrode lead has an overlapping area with one electrode coil; and each second electrode lead includes a second lead part outside the range of the electrode coil; and a second connecting part overlapping the electrode coil; where the second lead part is in the same conductive layer with the electrode coil; the second connecting part is not in the same conductive layer with the electrode coil; and the second connecting part electrically connects the electrode coil to the second lead part through a via hole.

Figure 6A:
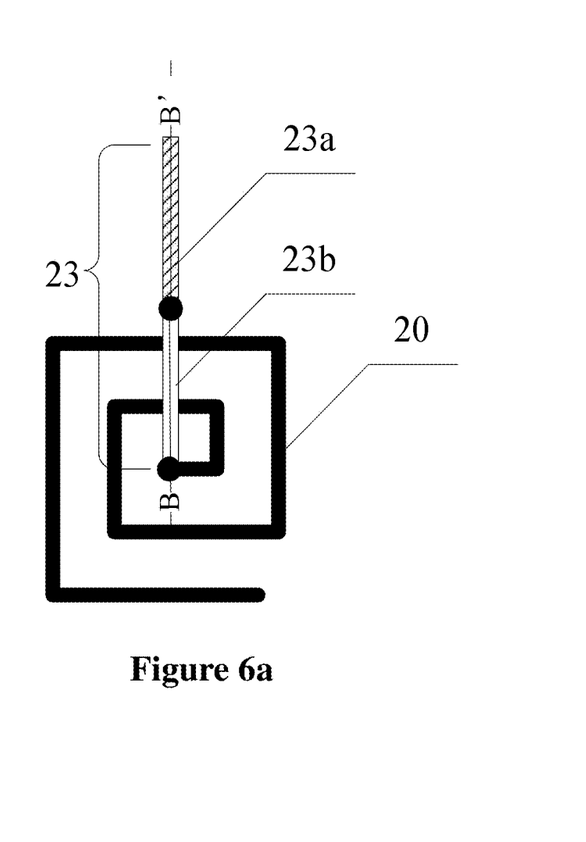
FIG. 6a depicts a schematic structural diagram of an electrode coil and an electrode lead overlapping the electrode coil.
Figure 6B:
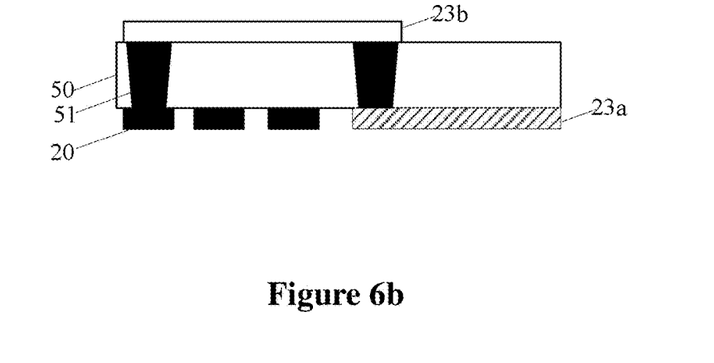
FIG. 6b depicts a sectional view of FIG. 6a along line of BB'.

Now with reference to FIG. 6a and FIG. 6b. FIG. 6a is a schematic structural diagram of an electrode coil and an electrode lead overlapping the electrode coil, and FIG. 6b is a sectional view of FIG. 6a along the line of BB'. At least one of the first electrode lead and the second electrode lead may overlap the electrode coil, where an electrode lead 23 having a portion overlapping with the electrode coil 20 includes: a lead part 23a outside the range of the electrode coil 20; and a connecting part 23b overlapping the electrode coil 20.

The lead part 23a is in the same conductive layer with the electrode coil 20; and the connecting part 23b is not in the same conductive layer with the electrode coil 20. An insulating layer 50 is provided between the connecting part 23b and the electrode coil 20, and the connecting part 23b electrically connects an end portion of the electrode coil 20 to the lead part 23a through a via hole.

It should be understood that, the electrode lead 23 in FIG. 6a and FIG. 6b may be either the first electrode lead or the second electrode lead.

The type of the array substrate according to the embodiments of the disclosure is not limited in the present disclosure.

For example, the array substrate according to the embodiments of the disclosure may be a top-gate array substrate or a bottom-gate array substrate, which may be chosen according to actual application. The array substrate according to the embodiments is described hereinafter in combination with FIG. 7 and FIG. 8.

Figure 7:
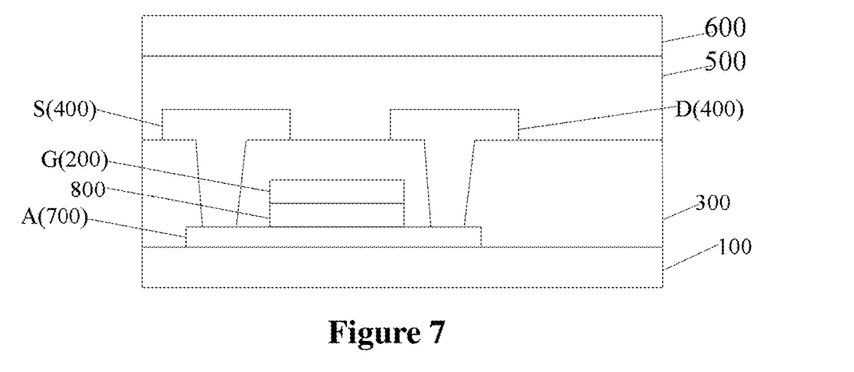
FIG. 7 depicts a schematic structural diagram of a top-gate array substrate according to an embodiment of the present disclosure.

FIG. 7 is a schematic structural diagram of a top-gate array substrate according to an embodiment of the present disclosure. The top-gate array substrate includes: a substrate 100; a gate layer 200 provided above any side of the substrate 100, including multiple gate lines and multiple gate electrodes G; a gate dielectric layer 300 provided on a side of the gate layer 200, the side of the gate layer 200 being away from the substrate 100; a source-drain layer 400 provided on a side of the gate dielectric layer 300, the side of the gate dielectric layer 300 being away from the substrate 100, where the source-drain layer 400 is provided with multiple data lines and multiple source electrodes S or drain electrodes D; a first insulating layer 500 provided on a side of the source-drain layer 400, the side of the source-drain layer 400 being away from the substrate 100; and a driving electrode layer 600 provided on a side of the first insulating layer 500, the side of the first insulating layer 500 being away from the substrate 100.

Specifically, since the array substrate in the embodiment is a top-gate array substrate, the array substrate further includes a semiconductor layer 700 provided between the substrate 100 and the gate electrode layer 200, multiple active regions (A) are provided in the semiconductor layer 700. Furthermore, the array substrate includes a gate insulating layer 800 provided between the semiconductor layer 700 and the gate layer 200.

The gate electrodes G, the active regions A and the source electrodes S or drain electrodes D constitute thin-film transistors of the array substrate.

Figure 8:
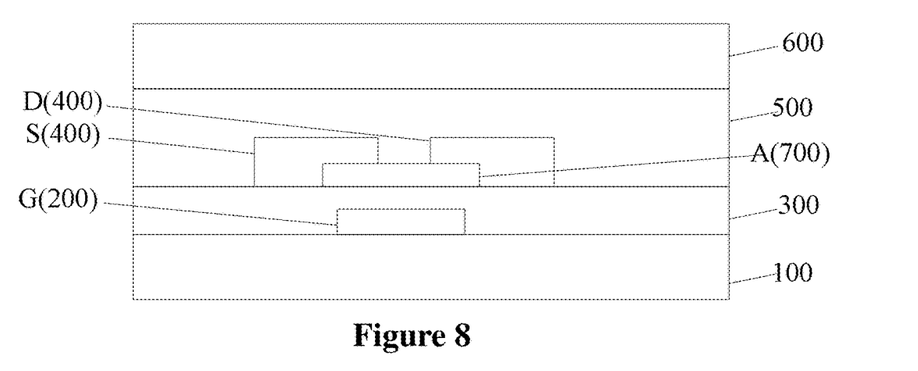
FIG. 8 depicts a schematic structural diagram of a bottom-gate array substrate according to an embodiment of the present disclosure.

FIG. 8 is a schematic structural diagram of a bottom-gate array substrate according to an embodiment of the present disclosure. The bottom-gate array substrate includes: a substrate 100; a gate layer 200 provided on any side of the substrate 100, including multiple gate lines and multiple gate electrodes G; a gate dielectric layer 300 provided on a side of the gate layer 200, the side of the gate layer 200 being away from the substrate 100; a source-drain layer 400 provided on a side of the gate dielectric layer 300, the side of the gate dielectric layer 300 being away from the substrate 100, where the source-drain layer 400 is provided with multiple data lines and multiple source electrodes S or drain electrodes D; a first insulating layer 500 provided on a side of the source-drain layer 400, the side of the source-drain layer 400 being away from the substrate 100; and a driving electrode layer 600 provided on a side of the first insulating layer 500, the side of the first insulating layer 500 being away from the substrate 100.

Specifically, since the array substrate in the embodiment is a bottom-gate array substrate, the array substrate further includes a semiconductor layer 700 provided between the gate dielectric layer 300 and the source-drain layer 400, and the semiconductor layer 700 is provided with multiple active regions A. The gate electrodes G, the active regions A and the source electrodes S or drain electrodes D constitute thin-film transistors of the array substrate.

According to the above, the array substrate according to the embodiments may be either a top-gate array substrate or a bottom-gate array substrate. In addition, locations of common electrodes and pixel electrodes of the array substrate according to the embodiments of the present disclosure are not limited. Specifically, the driving electrode layer includes first electrodes and second electrodes, where the first electrodes and the second electrodes are provide in the same layer; or the first electrodes and the second electrodes are provide in different layers and insulated from each other.

The first electrodes serve as common electrodes, and the second electrodes serve as pixel electrodes. Alternatively, the first electrodes serve as pixel electrodes, and the second electrodes serve as common electrodes.

Figure 9:
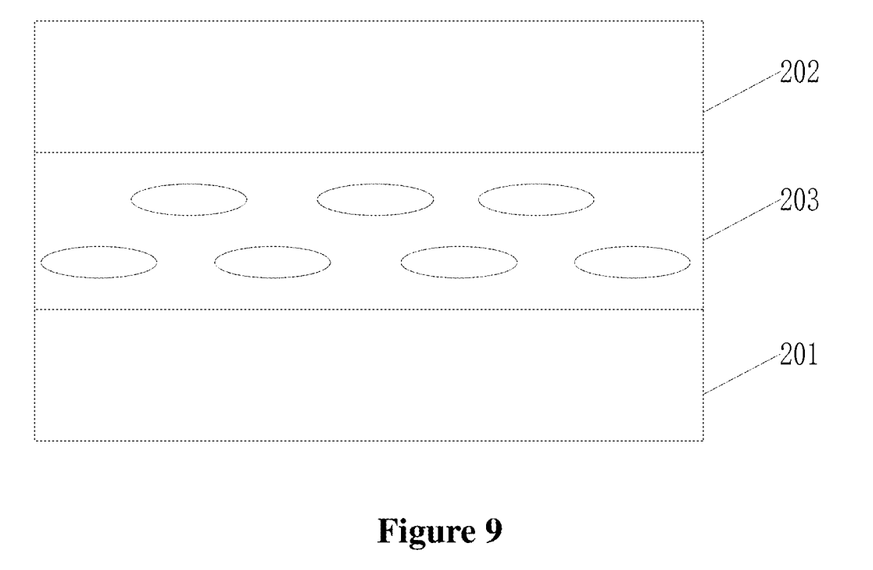
FIG. 9 depicts a schematic structural diagram of a display panel according to an embodiment of the present disclosure.

Correspondingly, a display panel is also provided in the disclosure. FIG. 9 is a schematic structural diagram of a display panel according to an embodiment of the present disclosure. The display panel includes: an array substrate 201 according to any one of the above embodiments; a color-film substrate 202; and a liquid crystal layer 203 provided between the array substrate 201 and the color-film substrate 202.

Figure 10:
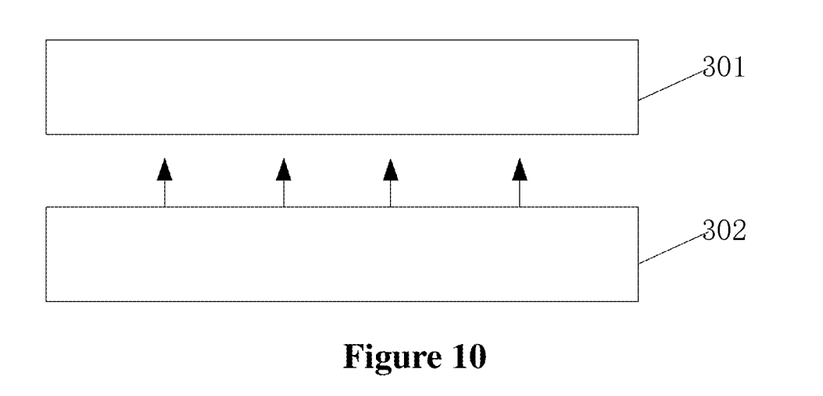
FIG. 10 depicts a schematic structural diagram of a display device according to an embodiment of the present disclosure.

In the end, a display device is also provided in the present disclosure. FIG. 10 is a schematic structural diagram of a display device according to an embodiment of the present disclosure. The display device includes: a display panel 301 in the above embodiment; and a backlight module 302 provided facing a light-reception side of the display panel 301.

It should be noted that arrows shown in FIG. 10 indicate a direction of light emitted by the backlight module. That is, the backlight module is provided facing a light-reception side of the display panel.

The array substrate, display panel and display device provided in the present disclosure each include multiple touch-control electrodes which are independent from each other, and multiple electrode coils, where the position of each of the electrode coils corresponds to the position of one of the touch-control electrodes. According to the above, the technical solutions provided in the present disclosure, the touch-control electrodes and the electrode coils are integrated into the array substrate, the touch panel needs not to be separately arranged outside the display device; hence, the thickness of the display device may be effectively reduced. In addition, the touch-control structure provided in the present disclosure includes the touch-control electrodes and the electrode coils, i.e., a self-capacitive touch-control structure and an inductive touch-control structure, enabling the display device to work in both the capacitive touch-control mode and the inductive touch-control mode; hence, the display device can be applicable to different applications by switching between the two touch-control modes, broadening the application range of the display device.

The descriptions of the embodiments herein enable those skilled in the art to implement or use the present disclosure. Numerous modifications to the embodiments are apparent to those skilled in the art, and the general principle herein can be implemented through other embodiments without deviation from the spirit or scope of the present disclosure. Therefore, the present disclosure may not be limited to the embodiments described herein, but in accordance with the widest scope consistent with the principle and novel features disclosed herein.

What is claimed is:

1. An array substrate, comprising:
a first conductive layer and a second conductive layer disposed on the array substrate and insulated from each other by a first insulating layer;
an array of self-capacitive touch-control electrodes disposed in the first conductive layer;
an array of electrode coils disposed in the second conductive layer, wherein each of the electrode coils has an inner end and an outer end, and wherein each of the electrode coil is electrically connected to one of the self-capacitive touch-control electrodes through a via hole and associated with the one self-capacitive touch-control electrode in a one-to-one relationship;
a plurality of first electrode leads each having a first end connecting to the inner end of one of the electrode coils in a one-to-one relationship, and a second end connecting to a reference signal end; and
a plurality of second electrode leads each having a first end connecting to the outer end of said electrode coil in a one-to-one relationship, and a second end connecting to a detection signal end,
wherein the array substrate works in both a self-capacitive touch-control mode and an inductive touch-control model;
wherein in the self-capacitive touch-control mode, a capacitive detection signal is transmitted to the outer end of one of the electrode coils through the second electrode lead, and then to the self-capacitive touch-control electrodes through the inter end of the one electrode coil; and
wherein in the inductive touch-control mode, an inductive detection signal is transmitted to the outer end of one of the electrode coils through the second electrode lead, and a reference signal is transmitted to the inter end of the one electrode coil through the first electrode lead.

2. The array substrate according to claim 1, wherein the array of self-capacitive touch-control electrodes is formed by dividing a common electrode disposed in the first conductive layer of the array substrate.

3. The array substrate according to claim 1, further comprising:
a plurality of switch units each having a first end, a second end, and a control end, wherein
the first end of each of the plurality of switch units is connected to the first end of each of the second electrode leads, the second end of each of the switch units is connected to the reference signal, and the control end of each of the switch units is connected to a control signal.

4. The array substrate according to claim 3 wherein the switch units are transistors, wherein a first terminal of each of the transistors is connected to the first end of one of the second electrode leads, wherein a second terminal of each of the transistors is connected to the reference signal, and wherein a control terminal of each of the transistors is connected to the control signal.

5. The array substrate according to claim 1, wherein each of the first electrode leads has a portion overlapping one of the electrode coils, and the first electrode leads are not in the same conductive layer with the electrode coils.

6. The array substrate according to claim 1, wherein each of the first electrode leads has a portion overlapping one of the electrode coils; and each of the first electrode leads comprises:
a first lead part outside the range of one electrode coil; and
a first connecting part overlapping the one electrode coil; wherein
the first lead part is in the same conductive layer with the one electrode coil; the first connecting part is not in the same conductive layer with the one electrode coil; and the first connecting part electrically connects the one electrode coil to the first lead part through a via hole.

7. The array substrate according to claim 1, wherein each of the second electrode leads has a portion overlapping one of the electrode coils, and the second electrode leads are not in the same conductive layer with the electrode coils.

8. The array substrate according to claim 1, wherein each of the second electrode leads has a portion overlapping one of the electrode coils; and each of the second electrode leads comprises:
a second lead part outside the range of one electrode coil; and
a second connecting part overlapping the one electrode coil; wherein
the second lead part is in the same conductive layer with the one electrode coil; the second connecting part is not in the same conductive layer with the one electrode coil; and the second connecting part electrically connects the one electrode coil to the second lead part through a via hole.

9. A display panel, comprising an array substrate according to claim 1.

10. A display device, comprising a display panel according to claim 9.

11. The array substrate according to claim 1, wherein each of the electrode coils overlaps with the associated self-capacitive touch-control electrode in a direction perpendicular to the array substrate.

* * * * *